(12) United States Patent
Fukui

(10) Patent No.: US 7,277,373 B2
(45) Date of Patent: Oct. 2, 2007

(54) OPTICAL DISC APPARATUS

(75) Inventor: Toshiaki Fukui, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 650 days.

(21) Appl. No.: 10/829,374

(22) Filed: Apr. 22, 2004

(65) Prior Publication Data

US 2004/0213139 A1   Oct. 28, 2004

(30) Foreign Application Priority Data

Apr. 24, 2003   (JP)   ............................. 2003-120399

(51) Int. Cl.
  *G11B 19/24*   (2006.01)
(52) U.S. Cl. ..................................... 369/53.2; 369/234
(58) Field of Classification Search ............... 369/53.3, 369/53.8, 232, 234
  See application file for complete search history.

(56) References Cited

U.S. PATENT DOCUMENTS 4,653,040 A * 3/1987 Senso ......................... 369/239
2004/0151096 A1 * 8/2004 Yoo ............................ 369/53.3

FOREIGN PATENT DOCUMENTS

| JP | 63-069061 | 3/1988 |
| JP | 08-167237 | 6/1996 |
| JP | 08-263930 | 10/1996 |
| JP | 09-035403 | 2/1997 |
| JP | 11-238297 | 8/1999 |
| JP | 2001-093146 | 4/2001 |

* cited by examiner

*Primary Examiner*—Wayne Young
*Assistant Examiner*—Lixi Chow
(74) *Attorney, Agent, or Firm*—Crowell & Moring LLP

(57) ABSTRACT

In an optical disc apparatus reading and writing data with respect to an optical disc, a motor controller uses widest pattern signals outputted from an optical pickup for judging size of an optical disc mounted on a turn table and stop of rotation of the optical disc. Since an inverse number of the widest pattern signal has correlation with a frequency sensed by a conventional frequency generator, the motor controller calculates a difference between inverse numbers of the widest pattern signals before and after putting braking force to the turn table, and judges the size of the optical disc with reference to variation of rotation speed before and after the braking. The motor controller further calculates a prediction time when the rotation of the optical disc will be stopped with using the variation of the inverse number of the widest pattern signal, stops to put the braking force to the turn table at the prediction time, and judges the rotation of the optical disc has been stopped.

9 Claims, 4 Drawing Sheets

OPTICAL DISC APPARATUS

BACKGROUND OF THE INVENTION

1. Field of the Invention

The present invention relates to an optical disc apparatus having functions for judging sizes of optical discs, and for judging stop of rotation of the optical disc.

2. Description of the Related Art

In the conventional optical disc apparatus, a tray is opened after stopping rotation of the optical disc, disposing the optical disc on the tray by lowering a turn table, and sliding the tray in front of the optical disc apparatus. The turn table is controlled to move downward after sensing the stop of rotation of the optical disc so as not to scratch a surface of the optical disc.

In the conventional optical disc apparatus, a frequency generator system is used for sensing the rotation speed of the optical disc, so that the stop of rotation of the optical disc can be sensed by the frequency generator. The frequency generator can be used for judging the size of the optical disc mounted on the turn table corresponding to the variation of the rotation speed of the optical disc. Thus, a spindle motor for rotating the optical disc can be controlled corresponding to the size of the optical disc.

The frequency generator is configured by a pattern of reflexive portions and irreflexive portions formed on a rear face of the turn table, an LED (light emitting diode) for irradiating a light beam to the pattern on the rear face of the turn table from a position below the turn table, a photo-detector for sensing variation of reflected light from the pattern on the rear face of the turn table and for converting the variation of the reflected light to electric signals, and a signal processor for processing the electric signals outputted from the photo-detector. The frequency generator is widely used in the conventional optical disc apparatus for sensing the rotation of the optical disc, since the variation of the reflected light from the pattern on the rear face of the turn table corresponds to the rotation speed of the optical disc.

The conventional optical disc apparatus using the frequency generator needs the LED, the photo-detector, a printed circuit board for mounting the LED and the photo-detector, and interconnection wirings for connecting the printed circuit board and a main circuit board of the optical apparatus. Thus, it is difficult not only to lower costs but also to downsize of the optical disc apparatus.

SUMMARY OF THE INVENTION

A purpose of the present invention is to provide an optical disc apparatus which can judge a size of an optical disc mounted on a turn table without using the frequency generator. Another purpose of the present invention is to provide an optical disc apparatus which can judge stop of rotation of the optical disc without using the frequency generator.

An optical disc apparatus in accordance with an aspect of the present invention comprises a motor for rotating a turn table on which an optical disc is mounted, an optical pickup for irradiating a light beam to the optical disc and receiving reflected light from the optical disc for reading and/or writing data with respect to the optical disc, and a motor controller for controlling the rotation of the motor.

When rotation speed of the optical disc reaches to a predetermined speed by driving the motor, the motor controller obtains a first widest pattern signal corresponding to a pulse width of a signal having the widest pattern among RF signals outputted from the optical pickup. After memorizes the first widest pattern signal in a memory, the motor controller supplies a braking voltage to the motor in a predetermined period. The motor controller further obtains a second widest pattern signal corresponding to a pulse width of a signal having the widest pattern among RF signals outputted from the optical pickup after supplying the braking voltage to the motor. The motor controller judges the size of the optical disc mounted on the turn table with reference to inverse numbers of the first widest pattern signal and the second widest pattern signal.

Since the inverse number of the widest pattern signal obtained by the motor controller has a correlation with a frequency outputted from the conventional frequency generator, it is possible to calculate the rotation number per a unit time of the optical disc or the turn table in a unit time can be calculated with using the inverse numbers of the first widest pattern signal and the second widest pattern signal. When the optical disc mounted on the turn table had a larger diameter, a moment of inertia around the rotation axis of the optical disc is larger, so that a difference of the rotation speeds of the optical disc before and after the braking is smaller. On the contrary, when the optical disc has a smaller diameter, a moment of inertia around the rotation axis of the optical disc is smaller, so that a difference of the rotation speeds of the optical disc before and after the braking is larger. Thus, it is possible to judge the size of the optical disc mounted on the turn table.

In another optical disc apparatus in accordance with another aspect of the present invention, the motor controller starts to supply a braking voltage to the motor when the optical disc mounted on the turn table is rotated by the driving force of the motor and focusing servo control of the optical pickup is functional, and observes a variation of a widest pattern signal corresponding to a pulse width of a signal having the widest pattern among RF signals outputted from the optical pickup. The motor controller calculates a prediction time when the rotation of the optical pickup will be stopped with reference to the variation of the widest pattern signal, and continues to supply the braking voltage to the motor until the prediction time. When the prediction time has passed, the motor controller judges that the rotation of the optical disc has stopped.

Since the value of the widest pattern signal becomes larger corresponding to the decrease of the rotation speed of the optical disc, it is possible to calculate the prediction time with reference to the variation of the value of the widest pattern signal without using the conventional frequency generator. Since the conventional frequency generator can be omitted from the optical disc apparatus, it is possible to lower the cost and to downsize of the optical disc apparatus.

DETAILED DESCRIPTION OF THE EMBODIMENT

An optical disc apparatus in accordance with an embodiment of the present invention is described.

Figure 1:
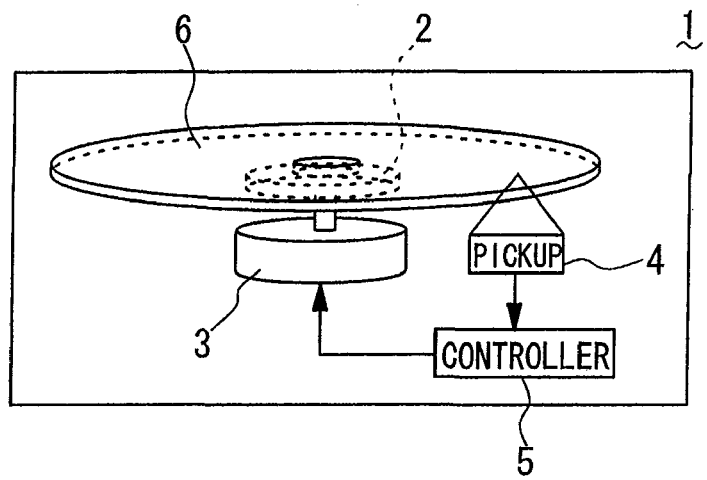
FIG. 1 is a schematic block diagram of an optical disc apparatus in accordance with an embodiment of the present invention.

FIG. 1 shows a configuration of the optical disc apparatus 1. The optical disc apparatus 1 writes on data and reads the data from an optical disc 6 which is mounted on a turn table 2 of the optical disc apparatus 1. The optical disc apparatus 1 is configured by the turn table 2 on which the optical disc 6 is mounted, a spindle motor 3 fro rotating the turn table 2, an optical pickup 4 for irradiating a laser beam to the optical disc 6 which is rotated by the spindle motor 3 via the turn table 2 and for receiving reflected light from the optical disc 6, and a motor controller 5 for controlling the rotation of the spindle motor 3. The motor controller 5 is, for example, configured by an ASIC (application specific integral circuit).

The optical pickup 4 has a semiconductor laser emitting the laser beam and a photo-detector receiving the reflected light. For writing the data on the optical disc 6, a power of the laser beam emitted from the semiconductor laser is increased than a power of the laser beam fro reading the data from the optical disc 6.

The optical disc apparatus 1 has functions for calculating rotation number per a unit time of the optical disc 6 based on RF signals outputted from the optical pickup 4 and for judging the size of the optical disc 6 from the rotation number per a unit time. The optical disc apparatus 1 further has a function for judging stop of rotation of the optical disc 6. Specifically, the motor controller 5 can sense the rotation number per a unit time of the optical disc 6 by calculation processing of a pulse width of a signal having the widest pattern (hereinafter, it is called "the widest pattern signal") among the RF signals outputted from the optical pickup 4, without using the frequency generator. The motor controller 5 uses the widest pattern signal for rough servo control of the optical pickup 4.

The widest pattern signal is defined as an integral multiple of a standard clock with respect to each standard of the optical disc. For example, the widest pattern signal for a CD (compact disc) is an eleven-fold of the standard clock, and the widest pattern signal for a DVD (digital versatile disc) is a fourteen-fold of the standard clock. Since acquisition of the widest pattern signal is substantially the same as that in the conventional motor controller of the optical disc apparatus, the description is omitted.

Figure 2A:
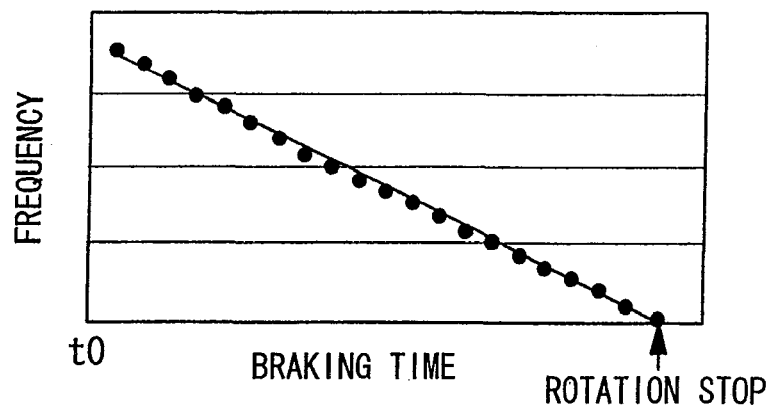
FIG. 2A is a graph showing a variation of a frequency of a conventional frequency generator provided while putting brake on an optical disc.
Figure 2B:
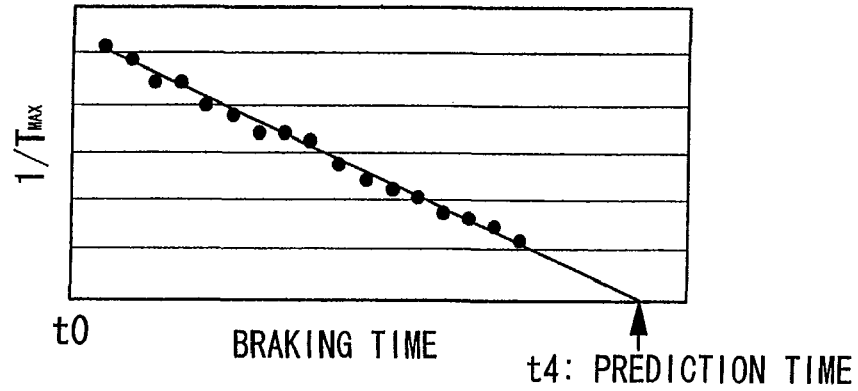
FIG. 2B is a graph showing a variation of an inverse number of a widest pattern signal $T_{MAX}$ obtained by a motor controller while putting brake on an optical disc in the optical disc apparatus in accordance with the embodiment.

FIG. 2A shows a variation of a frequency of the frequency generator provided in the conventional optical disc apparatus while putting the brake on the optical disc by supplying a braking voltage to the spindle motor. FIG. 2B shows a variation of an inverse number of the widest pattern signal $T_{MAX}$ obtained by the motor controller 5 while putting the brake on the optical disc 6 by supplying a braking voltage to the spindle motor 3.

As can be seen from FIG. 2A, the frequency of the frequency generator is linearly decreased corresponding to the decrease of the rotation speed of the optical disc. On the other hand, the pulse width of the RF signal outputted from the optical pickup 4 becomes gradually wider corresponding to the reduction of the rotation speed of the optical disc, so that the widest pattern signal $T_{MAX}$ becomes larger. As can be seen from FIG. 2B, the inverse number of the widest pattern number $T_{MAX}$, however, is linearly decreased, even though the widest pattern number $T_{MAX}$ is nonlinearly increased while the braking force is supplied to the spindle motor 3. As just described, a notable correlation can be recognized between the frequency of the frequency generator and the inverse number of the widest pattern signal $T_{MAX}$. Thus, it is possible to sense the rotation number per a unit time of the optical disc 6 corresponding to the rotation speed of the optical disc 6 by sensing the widest pattern signal $T_{MAX}$ via the optical pickup 4.

Since the frequency generator used in the conventional optical disc apparatus comprises the LED and the photo-detector for sensing the rotation number per a unit time of the turn table, it is possible to detect a signal corresponding to the frequency even when the rotation of the optical disc is stopped, as shown in FIG. 2A. In other wards, when the frequency generator is used, the complete stop of rotation of the optical disc can precisely be judged by sensing that the frequency becomes "0".

On the contrary, focusing servo control of the optical disc 4 becomes disfunctional when the rotation number per a unit time of the optical disc 6 becomes lower, so that the widest pattern signal $T_{MAX}$ cannot be sensed, as shown in FIG. 2B. It, however, is possible to calculate a time t4 when the rotation of the optical disc 6 will be stopped according to the variation of the inverse number of the widest pattern signal $T_{MAX}$ which is obtained while the focusing servo control of the optical disc 4 has been functional. Furthermore, there is a correlation between the frequency of the frequency generator and the inverse number of the widest pattern signal $T_{MAX}$, so that the prediction time t4 substantially coincides with the time of the stop of rotation of the optical disc sensed by the frequency generator.

Figure 3:
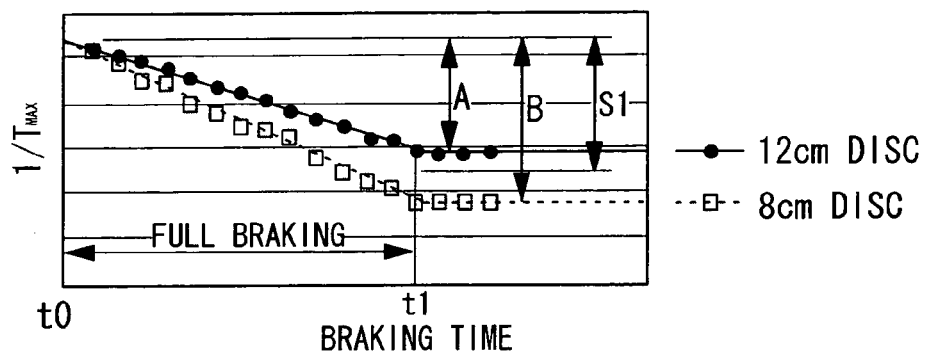
FIG. 3 is a graph showing variations of inverse numbers of the widest pattern signals $T_{MAX}$ with respect to the optical discs respectively having diameters of 12 cm and 8 cm.

FIG. 3 shows variations of the inverse numbers of the widest pattern signals $T_{MAX}$ with respect to the optical discs respectively having diameters of 12 cm and 8 cm, while the rotation speed of the optical disc 6 is decreased. The widest pattern signals $T_{MAX}$ are obtained by the motor controller 5 while the braking voltage has been supplied to the spindle motor 3 rotating the optical disc 6 in a predetermined rotation speed.

As shown in FIG. 3, a full braking voltage is supplied to the spindle motor 3 from time t0 to time t1. The motor controller 5 obtains a first widest pattern signal $T_{MAX1}$ before the start of braking (before the time t0) and a second widest pattern signal $T_{MAX2}$ after stopping the braking (after the time t1).

When an optical disc having a diameter of 12 cm is mounted on the turn table, a moment of inertia around the rotation axis of the optical disc is larger. Thus, a difference of the rotation numbers per a unit time or rotation speeds of the optical disc before and after the braking becomes smaller, so that a difference "A" between an inverse number of the first widest pattern signal $T_{MAX1}$ and an inverse number of the second widest pattern signal $T_{MAX2}$ becomes also smaller. On the contrary, when an optical disc having a diameter of 8 cm is mounted on the turn table, a moment of inertia around the rotation axis of the optical disc is smaller. Thus, a difference of the rotation numbers per a unit time or rotation speeds of the optical disc before and after the braking becomes larger, so that a difference "B" between an inverse number of the first widest pattern signal $T_{MAX1}$ and an inverse number of the second widest pattern signal $T_{MAX2}$ becomes also larger. Accordingly, it is possible to judge whether the mounted optical disc has the diameter of 8 cm or 12 cm by judging the difference of the inverse numbers of the first widest pattern signal $T_{MAX1}$ and the second widest pattern signal $T_{MAX2}$ is larger than a threshold value S1 or not. The threshold value S1 is optionally selected to be an intermediate value between the difference "A" and the difference "B".

Figure 4:
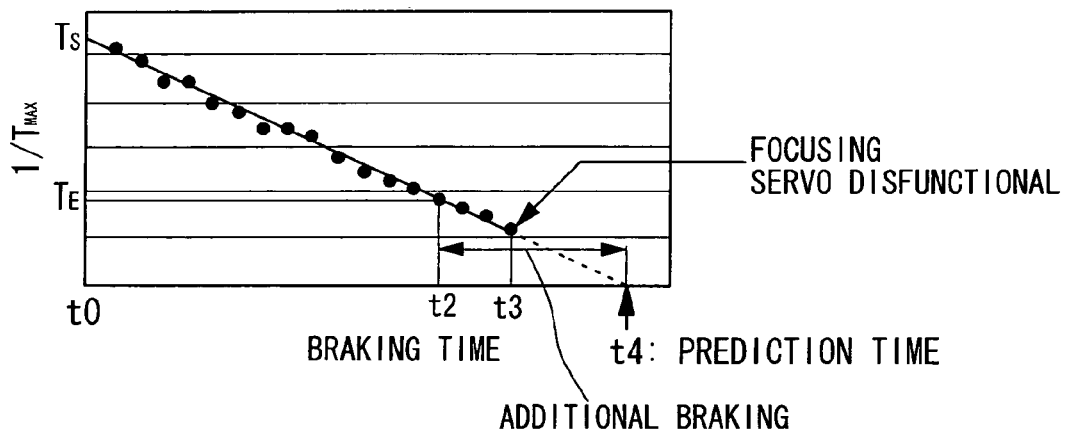
FIG. 4 is a graph showing a variation of the inverse number of the widest pattern signal $T_{MAX}$ obtained by the motor controller until the rotation of the optical disc is judged to be stopped and prediction time t4 when the rotation of the optical disc will be stopped.

FIG. 4 shows a variation of the inverse number of the widest pattern signal $T_{MAX}$ obtained by the motor controller 5 until the rotation of the optical disc 6 is judged to be stopped after the braking voltage is supplied to the spindle motor 3. FIG. 4 further shows the prediction time t4 when the rotation of the optical disc 6 will be stopped.

In the optical disc apparatus 1, the motor controller 5 calculates the prediction time t4 when the rotation of the optical disc 6 will be stopped with using the inverse number $T_S$ of the widest pattern signal $T_{MAX}$ at the start of braking and the inverse number $T_E$ of the widest pattern signal $T_{MAX}$ at a time t2. Subsequently, the motor controller 5 supplies the braking voltage to the spindle motor 3 from the time t2 to the prediction time t4. The time t2 must be set before a time t3 when the focusing servo control of the optical pickup 4 becomes disfunctional. It, however, is preferable to set the time t2 as nearer to the time t3 as possible for increasing precision of the prediction time t4.

The prediction time t4 can be obtained by regression analysis of the inverse number of the largest pattern signal $T_{MAX}$ obtained by the motor controller 5 from the time t0 to the time t2. The prediction time t4, however, can simply calculated by the following equation.

$$t4-t2 = t2 \times T_E/(T_s - T_E)$$

Since the prediction time t4 obtained by the equation is merely a predictive time calculated from the inverse number of the widest pattern signal $T_{MAX}$, so that the prediction time t4 could be disagree with actual time when the rotation of the optical disc is stopped. Thus, the motor controller 5 in the optical disc apparatus 1 judges that the rotation of the optical disc 5 has been stopped after waiting a predetermined margin time from releasing the braking voltage at the prediction time t4. It is necessary that the predetermined margin time is sufficient to stop the rotation of the optical disc 6 which is rotated at a very slow rotation speed by inertia after releasing the braking voltage to the spindle motor 3. The values of the margin time are specifically set with respect to the sizes of the optical discs.

Figure 5:
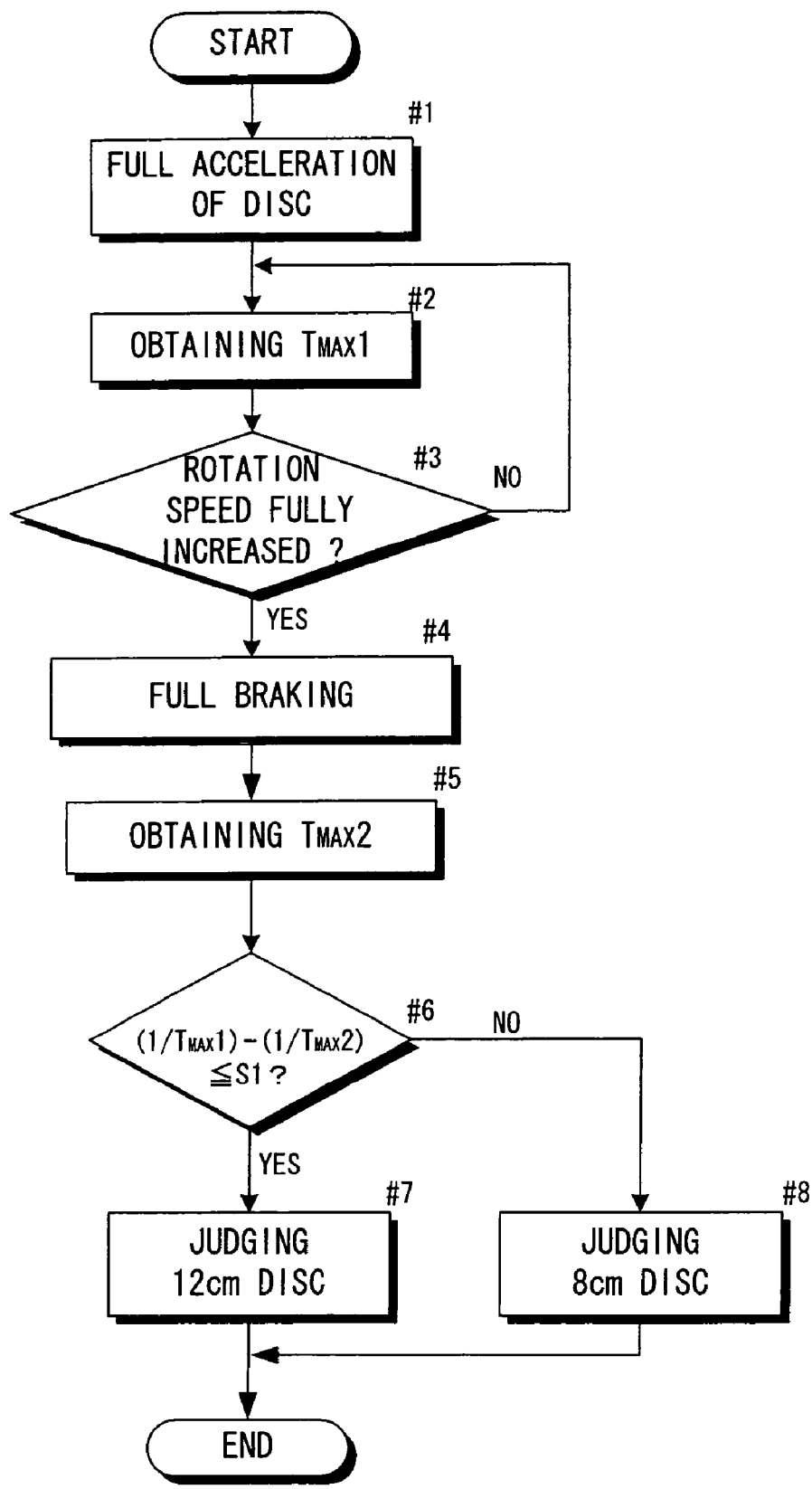
FIG. 5 is a flowchart showing a disc size judging operation of the motor controller of the optical disc apparatus in the embodiment.

Subsequently, a disc size judging operation of the motor controller 5 for judging the size of the optical disc is described with reference to FIG. 5.

First, the spindle motor 3 is fully accelerated for rotating the optical disc 6 (#1). The motor controller 5 obtains the first widest pattern signal $T_{MAX1}$ and memorizes the value of the first widest pattern signal $T_{MAX1}$ in a memory (#2). The motor controller 5 repeats the operation for taking and renewing the first widest pattern signal $T_{MAX1}$ until the rotation number per a unit time of the optical disc 6 reaches to a predetermined number (YES in step #3).

When the rotation number per a unit time of the optical disc 6 reaches to the predetermined number, the motor controller 5 starts to supply the full braking voltage to the spindle motor 3 in a predetermined period (#4), and obtains the second widest pattern signal $T_{MAX2}$ (#5).

Subsequently, the motor controller 5 calculates the difference $\{(1/T_{MAX1})-(1/T_{MAX2})\}$ between the inverse number of the first widest pattern signal $T_{MAX1}$ and the inverse number of the second widest pattern signal $T_{MAX2}$. When the value of the difference is equal to or smaller than the predetermined threshold value S1 (YES in step #6), the motor controller 5 judges that the optical disc 6 mounted on the turn table is a disc having a diameter of 12 cm (#7). Alternatively, when the value of the difference is larger than the predetermined threshold value S1 (NO in step #6), the motor controller 5 judges that the optical disc 6 mounted on the turn table is a disc having a diameter of 8 cm (#8). After judging the size of the optical disc 6, the motor controller 5 finishes the disc size judging operation.

Figure 6:
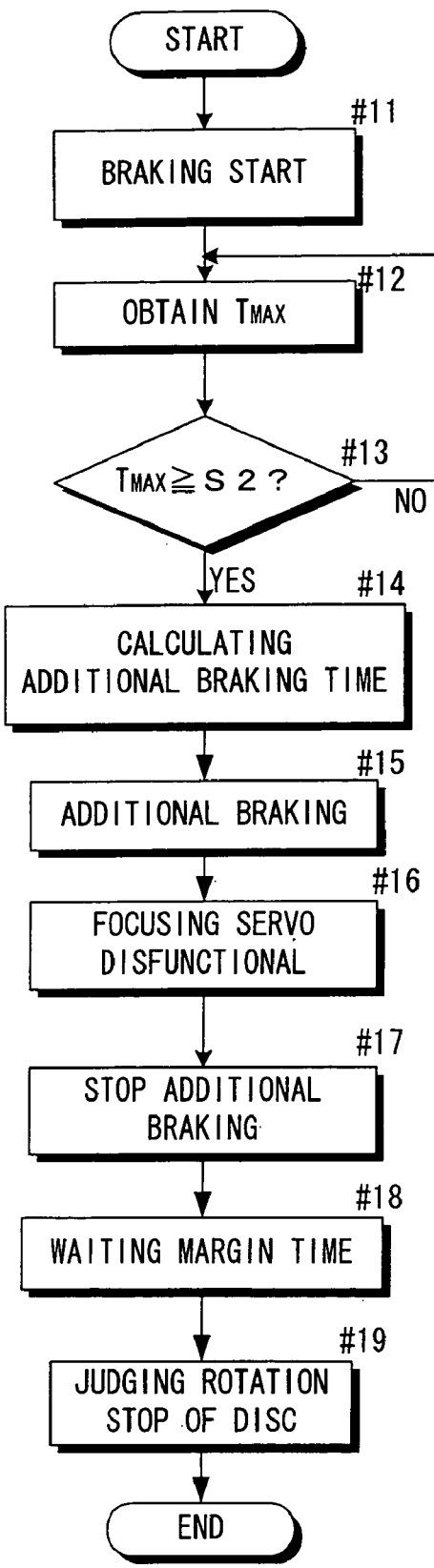
FIG. 6 is a flowchart showing a stop judging operation of the motor controller of the optical disc apparatus in the embodiment.

Subsequently, a stop judging operation of the motor controller 5 for judging whether the rotation of the optical disc has been stopped or not is described with reference to FIG. 6.

The motor controller 5 starts braking of the spindle motor 3 by supplying the braking voltage corresponding to the size of the optical disc 6 judged by the above-mentioned disc size judging operation (#11). The motor controller 5 obtains the widest pattern signal $T_{MAX}$ at the start of braking, and memorizes the value of the widest pattern signal $T_{MAX}$ in the memory (#12). The motor controller 5 repeats the operation for taking and memorizing the widest pattern signal $T_{MAX}$ until the value of the widest pattern signal $T_{MAX}$ becomes equal to or larger than a threshold value S2 (YES in step #13). All the values of the widest pattern signal $T_{MAX}$ obtained in the repetition of the step #12 are memorized in the memory.

The motor controller 5 calculates the variation of the values of the widest pattern signals $T_{MAX}$ memorized in the memory, and further calculates the prediction time t4 or additional braking time with reference to the calculated variation of the widest pattern signals $T_{MAX}$ (#14). The motor controller 5 continues to supply the braking voltage to the spindle motor 3 until the prediction time t4 (#15).

Following to the decrease of the rotation number per a unit time of the optical disc 6, the focusing servo control of the optical pickup 4 becomes disfunctional at the time t3 before the prediction time t4 (#16). The motor controller 5 stops to supply the braking voltage to the spindle motor 3 at the prediction time t4. Even when the prediction time t4 has passed, the optical disc 6 could be rotated at a very slow rotation speed. Thus, the motor controller 5 waits a predetermined margin time (#18). After waiting the margin time, the motor controller 5 judges that the rotation of the optical disc 6 has been stopped (#19). The motor controller 5 finishes the stop judging operation.

As mentioned above, in the optical disc apparatus 1 in accordance with the embodiment of the present invention, the motor controller 5 judges the size of the optical disc 6 mounted on the turn table with reference to the difference between the rotation numbers per a unit time of the optical disc before and after starting braking operation of the spindle motor 3 which are calculated with using the widest pattern signals $T_{MAX}$. Thus, it is possible to judge the size of the optical disc 6 mounted on the turn table without using the conventional frequency generator. Furthermore, the motor controller 5 calculates the prediction time t4 when the rotation of the optical disc 6 will be stopped with correspondence to the variation of the widest pattern signal $T_{MAX}$. Thus, it is possible to judge the rotation of the optical disc 6 has been stopped without using the frequency generator. As a result, the expensive frequency generator can be omitted from the optical disc apparatus 1, so that the cost of the optical disc apparatus 1 can be reduced, and the optical disc apparatus 1 can be downsized.

Still furthermore, it is possible to modify the optical disc apparatus 1 in several manners. For example, when the inverse number of the widest pattern signal $T_{MAX}$ becomes equal to or smaller than a predetermined threshold value, the motor controller 5 can judge that the rotation of the optical disc 5 is closed to be stopped and can stop the suppliance of the braking voltage to the spindle motor 3. After waiting the predetermined time, the motor controller 5 can judge that the rotation of the optical disc 6 has been stopped.

This application is based on Japanese patent application 2003-120399 filed Apr. 24, 2003 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disc apparatus comprising a motor for rotating a turn table on which an optical disc is mounted, an optical pickup for irradiating a light beam to the optical disc and receiving reflected light from the optical disc for reading and/or writing data with respect to the optical disc, and a motor controller for controlling the rotation of the motor, wherein the motor controller executes the following processes:

obtaining a first widest pattern signal corresponding to a pulse width of a signal having the widest pattern among RF signals outputted from the optical pickup, when rotation speed of the optical disc reaches to a predetermined speed by driving the motor;

memorizing the first widest pattern signal in a memory;

supplying a braking voltage to the motor in a predetermined period;

further obtaining a second widest pattern signal corresponding to a pulse width of a signal having the widest pattern among RF signals outputted from the optical pickup after supplying the braking voltage to the motor; and judging the size of the optical disc mounted on the turn table with reference to inverse numbers of the first widest pattern signal and the second widest pattern signal.

2. The optical disc apparatus in accordance with claim 1, wherein the motor controller calculates rotation speeds of the optical disc before and after starting the braking of the optical disc with using the first widest pattern signal and the second widest pattern signal, calculates a difference between the rotation speeds, and judges the size of the optical disc mounted on the turn table corresponding to the difference.

3. The optical disc apparatus in accordance with claim 1, wherein the motor controller obtains the second widest pattern signal before focusing servo control of the optical pickup becomes disfunctional.

4. The optical disc apparatus in accordance with claim 1, wherein the motor controller further executes the following processes:

starting to supply a braking voltage to the motor when the optical disc mounted on the turn table is rotated by the driving force of the motor and focusing servo control of the optical pickup is functional;

observing a variation of a widest pattern signal corresponding to a pulse width of a signal having the widest pattern among RF signals outputted from the optical pickup;

calculating a prediction time when the rotation of the optical disc will be stopped with reference to the variation of the widest pattern signal;

continuing to supply the braking voltage to the motor until the prediction time; and judging that the rotation of the optical disc has stopped, when the prediction time has passed.

5. The optical disc apparatus in accordance with claim 4, wherein the motor controller judges that the rotation of the optical disc has stopped, after passing a predetermined margin time which is sufficient to stop the rotation of the optical disc through inertia from the prediction time.

6. The optical disc apparatus in accordance with claim 1, wherein the motor controller further executes the following processes:

starting to supply a braking voltage to the motor when the optical disc mounted on the turn table is rotated by the driving force of the motor and focusing servo control of the optical pickup is functional;

observing a variation of a widest pattern signal corresponding to a pulse width of a signal having the widest pattern among RF signals outputted from the optical pickup;

stopping suppliance of the braking voltage to the motor when an inverse number of the widest pattern signal becomes equal to or smaller than a predetermined threshold value; and judging that the rotation of the optical disc has stopped, after waiting a predetermined period sufficient to stop the rotation of the optical disc through inertia.

7. An optical disc apparatus comprising a motor for rotating a turn table on which an optical disc is mounted, an optical pickup for irradiating a light beam to the optical disc and receiving reflected light from the optical disc for reading and/or writing data with respect to the optical disc, and a motor controller for controlling the rotation of the motor, wherein the motor controller executes the following processes:

starting to supply a braking voltage to the motor when the optical disc mounted on the turn table is rotated by the driving force of the motor and focusing servo control of the optical pickup is functional;

observing a variation of a widest pattern signal corresponding to a pulse width of a signal having the widest pattern among RF signals outputted from the optical pickup;

calculating a prediction time when the rotation of the optical disc will be stopped with reference to the variation of the widest pattern signal;

continuing to supply the braking voltage to the motor until the prediction time; and judging that the rotation of the optical disc has stopped, when the prediction time has passed.

8. The optical disc apparatus in accordance with claim 7, wherein the motor controller judges that the rotation of the optical disc has stopped, after passing a predetermined margin time which is sufficient to stop the rotation of the optical disc through inertia from the prediction time.

9. An optical disc apparatus comprising a motor for rotating a turn table on which an optical disc is mounted, an optical pickup for irradiating a light beam to the optical disc and receiving reflected light from the optical disc for reading and/or writing data with respect to the optical disc, and a motor controller for controlling the rotation of the motor, wherein the motor controller executes the following processes:

starting to supply a braking voltage to the motor when the optical disc mounted on the turn table is rotated by the driving force of the motor and focusing servo control of the optical pickup is functional;

observing a variation of a widest pattern signal corresponding to a pulse width of a signal having the widest pattern among RF signals outputted from the optical pickup;

stopping suppliance of the braking voltage to the motor when an inverse number of the widest pattern signal becomes equal to or smaller than a predetermined threshold value; and judging that the rotation of the optical disc has stopped, after waiting a predetermined period sufficient to stop the rotation of the optical disc through inertia.

* * * * *